Patented Mar. 7, 1950

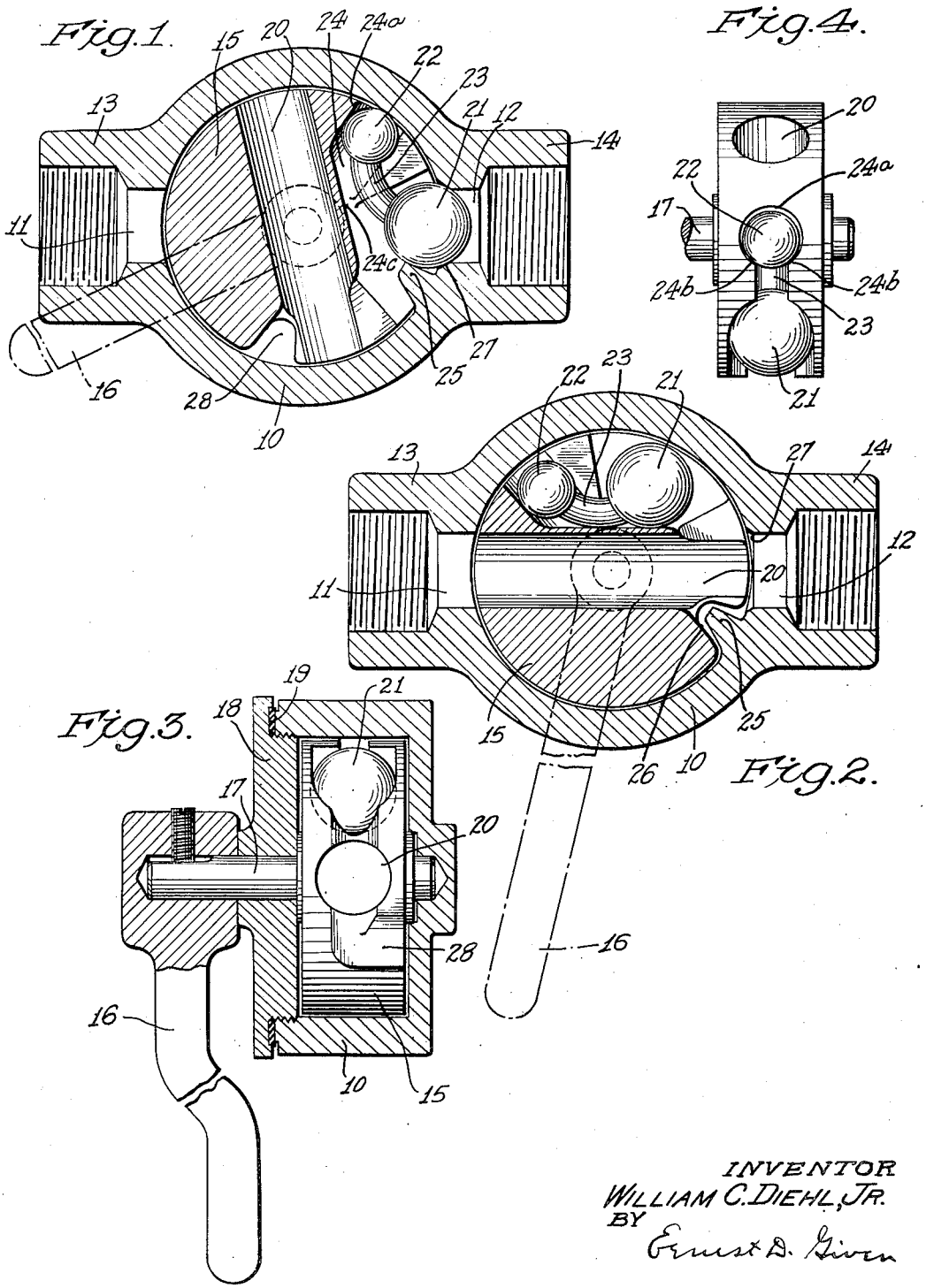

2,499,732

UNITED STATES PATENT OFFICE 2,499,732

VALVE

William C. Diehl, Jr., North Bergen, N. J.

Application March 15, 1946, Serial No. 654,611

7 Claims. (Cl. 251—102)

This invention relates to improvements in valves and more particularly to improvements in valves of what may be termed "combined plug and ball types."

Conventional plug valves are of comparatively simple construction. When fully open they afford an unimpeded passage to flow of the medium through the valve. However, with such valves tight seals are comparatively difficult to obtain and maintain. Ball valves on the other hand afford tight sealing. However, unseating of the ball under pressure conditions is difficult. Furthermore, such valves when wide open usually restrict the flow of the controlled medium to a certain extent.

Attempts have heretofore been made to obtain the advantages of both types in combined constructions. However such constructions have been complicated and expensive and have not been entirely satisfactory for various reasons. According to and for the general objects of the present invention, a construction is provided which comprises in general three main parts, i. e. a valve body which includes inlet and outlet ports for the medium. The outlet port is provided with a ball seat. Within the valve body there is a plug or rotor which has a straight through clear passage adapted for registry with the inlet and outlet ports when the valve is fully open. For closing and completely shutting off the flow of the medium, there is provided a ball assemblage which includes a sealing ball and a pilot ball which is preferably integrally connected to the sealing ball. A cam track is also provided in the rotor with which the pilot ball cooperates. The valve body portion is also provided with a stop to coact with the sealing ball and direct it into cooperation with the seat upon rotation of the valve plug to closed position. Upon rotation of the plug in reverse direction, the pilot ball in camming cooperation with the cam track which is disposed wholly within the plug itself, acts forcibly to withdraw the sealing ball from its seat and thus minimizes the force required to open the valve.

Further and other incidental objects will be hereinafter pointed out in the accompanying specification and claims.

In the drawings:

Figure 1 is a central sectional view through the valve showing the parts in closed position;

Fig. 2 is a similar central sectional view showing the valve in open position;

Fig. 3 is a vertical sectional view through the valve housing and cover, but showing the rotor in full, in elevation; and Fig. 4 is an elevational view of the rotor with the sealing ball and pilot ball in position therein.

The valve generally comprises a valve body 10 having an inlet port 11 and an outlet port 12. Suitable inlet and outlet necks 13 and 14 are provided, adapted to receive inlet and outlet pipes, not shown. Relatively rotatable with respect to the valve body is a shiftable plug or rotor generally designated 15. A suitable handle 16 is connected to a stud 17 which is carried by and secured to the plug 15. A suitable cover 18 is secured to the open top of the valve body in any suitable manner as by the threads shown in Fig. 3. 19 designates a sealing gasket. The plug 15 is provided with a through passage 20 adapted to register with both the inlet and outlet ports. With the plug or rotor in this position (i. e. valve open position) there is a free and unrestricted passage through the valve. The valve plug is provided with a recessed portion on one face thereof. This recessed portion carries a ball sealing and pilot ball assembly which includes a sealing ball 21 and a pilot ball 22. The pilot ball 22 is preferably connected to the sealing ball 21 by a neck 23. The pilot ball is disposed in a cam track portion generally designated 24 in Fig. 1. 24a designates one edge of the cam track and 24b (see Fig. 4) designates the other edge of the cam track. 25 is a stop lug or member which is preferably formed integral with the body portion 10. This stop is adapted to abut a surface 26 on the plug and limit counterclockwise (as seen in Fig. 2) movement of the valve plug or rotor with the valve in open position. The stop 25 is disposed in a plane to intercept the sealing ball 21 and force it into cooperation with the ball seat 27 (see Fig. 1). It will be understood that the sealing ball will be tightly forced to its seat when the valve is in the closed position (see Fig. 1).

Assuming that the valve is in closed position (as seen in Fig. 1) and that the handle 16 be moved in a counterclockwise direction, the effect of this movement will be to cause the pilot ball 22 to move down its cam track 24; and such movement of the pilot ball will withdraw the sealing ball 21 from the seat. Ultimately the sealing ball will assume the position shown in Fig. 2, the sealing ball fitting rather loosely within the bored out portion of the housing 10.

During the closing movement of the valve, liquid or other medium will escape into the side cavity which opens into the through passage 20 and continue to pass out the outlet port until the sealing ball is intercepted by the stop 25. Thereafter the sealing ball will be forced into tight cooperation with the seat. A notch 28 (Fig. 3) is provided in the lower part of the plug to allow the abutment 25 to pass it in assembling the plug into the valve body.

When the valve is closed, the pressure of the medium on the sealing ball will tend to hold it onto its seat. This action is provided for by a rather loose fit of the plug 15 within the body 10 so that even when the plug is in its valve closing position shown in Fig. 1, there is maintained in the passage 20 of the plug and in rear of the ball 21 a fluid pressure substantially the same as that in the inlet port of the valve. As shown in Figs. 1 and 2 the recess in the plug 15 in which the ball 21 is disposed is always in open communication with the passage 20 through a circumferential channel provided in the plug and arranged in alignment with the abutment 25. The cam track and pilot ball arrangement acts positively to lift the sealing ball off its seat and to overcome the force of the medium tending to hold the sealing ball on its seat. The sealing ball is forcibly lifted to a position in which it can clear the inner wall of the outer housing. The rotor or plug constitutes a movable support for both the sealing ball and pilot ball and all camming elements are disposed wholly upon said movable support.

Upon initial opening movement of the plug, the first action of the pilot balls, in moving substantially radially inwardly in the cam track 24, is effective to rotate the sealing ball 21 with respect to its seat. This is due to the rigid connection between the sealing ball and pilot ball. This loosens the sealing ball on its seat. Thereafter the pilot ball reaches the innermost end of its cam track and is arrested by contact with surface 24c. Continued opening movement of the rotor acts on the pilot ball to draw the sealing ball positively off its seat. At this time the pilot ball being at its innermost radial position provides maximum leverage on the sealing ball. Accordingly, the force on the handle is not excessive when the parts are in this intermediate position.

It is further possible partially to close the valve by displacing the plug slightly away from the full open position. The plug will remain in the position so set.

What I claim is:

1. A plug valve, comprising a body having inlet and outlet ports, a plug rotatable in said body between open and closed positions, said plug having an uninterrupted through passage positioned to register with said ports at the open position of said plug, a sealing ball disposed in a recess in the periphery of said plug and arranged for sealing one of said ports, means rigid with said body and extending into the path of said sealing ball for directing said ball onto its seat in sealing relation to said one port, and means carried by said plug and mechanically effective on said sealing ball and acting in cooperation with said rigid means to force said ball onto its seat by pressure mechanically applied thereto and derived from force applied for rotating said plug toward its closed position.

2. A plug valve, comprising a body having inlet and outlet ports, a plug rotatable in said body, between open and closed positions, said plug having an uninterrupted through passage positioned to register with said ports at the open position of said plug, a sealing ball disposed in a recess in the periphery of said plug and arranged for sealing one of said ports, and means effective on rotation of said plug from its closed toward its open position for first positively rotating said ball about its own center to free it from its seat and thereafter for positively withdrawing said ball from its seat, the last named means comprising a cam track formed wholly in said plug, a cam follower in said cam track, and means rigidly connecting said cam follower with said ball.

3. A plug valve, comprising a body having inlet and outlet ports, a plug rotatable in said body between open and closed positions, said plug having an uninterrupted through passage positioned to register with said ports at the open position of said plug, a sealing ball disposed in a recess in the periphery of said plug and arranged for sealing said outlet port, means rigid with said body and extending into the path of said sealing ball for directing said ball onto its seat in sealing relation to said outlet port, a cam track formed wholly within said plug, a pilot ball in said cam track, and means rigidly connecting said pilot ball and said sealing ball, the aforesaid parts being so constructed and arranged that closing movement of said plug is effective to move said sealing ball into engagement with said rigid means for directing said sealing ball onto its seat, and thereafter force is effective through said plug, said cam track, said pilot ball and the means rigidly connecting said pilot and sealing balls to seat said sealing ball positively by directly applied mechanical pressure, and upon opening movement of said plug, said sealing ball is first rotated in respect to its seat about its own center by movement of said pilot ball along said cam track and thereafter said sealing ball is positively withdrawn from its seat.

4. A plug valve, comprising a body having an inlet port and having an outlet port providing a seat, a plug rotatable in said body between open and closed positions, said plug having a passage formed therein and positioned to register with said inlet and outlet ports at the open position of said plug, a sealing ball disposed in a recess in the periphery of said plug and arranged to cooperate with said seat in the closed position of said plug, in which position said recess is opposite said outlet port, an abutment rigid with said body adjacent to said outlet port and extending into the path of said ball for directing said ball onto said seat in sealing relation to said outlet port, said plug being sufficiently freely received in said body so that fluid pressure from said inlet port will be effective within said passage of said plug, and a passage communicating between said passage of said plug and said recess, so that when said plug is rotated to its said open position and said ball is directed onto its seat by such rotation and by said abutment engaging said ball, fluid pressure from said inlet port will be effective so as to tend to hold said ball on its seat, closing said outlet port.

5. A plug valve according to claim 4, wherein means are provided for positively withdrawing said ball from its seat in response to rotative movement of said plug from its closed position toward its open position, such positive withdrawing means comprising a cam track formed wholly in said plug and arranged non-concentric with the axis of rotation thereof, a cam follower movably mounted in said cam track, and means mechanically connecting said cam follower and said ball, the parts being so constructed and arranged that the combined rotative movement of said plug in moving from its closed position toward its open position and a consequent movement of said cam follower along said cam track will exert a pulling force on said ball through said mechanically connecting means to move said ball off its seat.

6. A plug valve, comprising a body having inlet and outlet ports, one of said ports providing a seat, a plug rotatable in said body between open and closed positions, said plug having a passage therein positioned to register with said ports at the open position of said plug, a sealing member disposed in a recess in the periphery of said plug, said recess being disposed to be opposite the port provided with said seat at the closed position of said plug so that said sealing member may be disposed on said seat to close the associated port at the closed position of said plug, means effective when said valve is in use and when said plug is at its closed position tending to hold said sealing member onto said seat to close the associated port, and means for positively withdrawing said sealing member from said seat in response to rotative movement of said plug from its closed position toward its open position; the last named means comprising a cam track formed wholly in said plug and arranged non-concentric with the axis of rotation thereof, a cam follower movably mounted in said cam track, and means mechanically connecting said cam follower and said sealing member; the parts being so constructed and arranged that the combined rotative movement of said plug in moving from its closed position toward its open position and a consequent movement of said cam follower along said cam track will exert a pulling force on said sealing member through said mechanically connecting means to move said sealing member off its seat.

7. A valve having a body with inlet and outlet ports, one of said ports being provided with a seat, a rotatable plug within said body having a through passage adapted to register with said ports, and including in combination, a sealing ball and a pivot ball both movably carried by and displaceable with said plug, but both separate from and movable in respect to said plug, means mechanically interconnecting said sealing ball and said pilot ball, an abutment on the body for arresting said sealing ball and displacing it toward said seat upon closing movement of said plug, and camming means formed wholly in said plug cooperating with said pilot ball for withdrawing said sealing ball from cooperation with said seat upon opening movement of said plug in respect to said body.

WILLIAM C. DIEHL, Jr.

REFERENCES CITED

The following references are of record in the file of this patent:

UNITED STATES PATENTS

| Number | Name | Date |
| --- | --- | --- |
| 1,044,124 | Bessert | Nov. 12, 1912 |

FOREIGN PATENTS

| Number | Country | Date |
| --- | --- | --- |
| 576,459 | France | May 14, 1924 |
| 734,204 | France | July 26, 1932 |

Certificate of Correction

Patent No. 2,499,732 March 7, 1950

WILLIAM C. DIEHL, Jr.

It is hereby certified that error appears in the printed specification of the above numbered patent requiring correction as follows:

Column 6, line 8, for "pivot" read *pilot*;

and that the said Letters Patent should be read with this correction therein that the same may conform to the record of the case in the Patent Office.

Signed and sealed this 4th day of July, A. D. 1950.

[SEAL]

THOMAS F. MURPHY,
*Assistant Commissioner of Patents.*